UNITED STATES PATENT OFFICE.

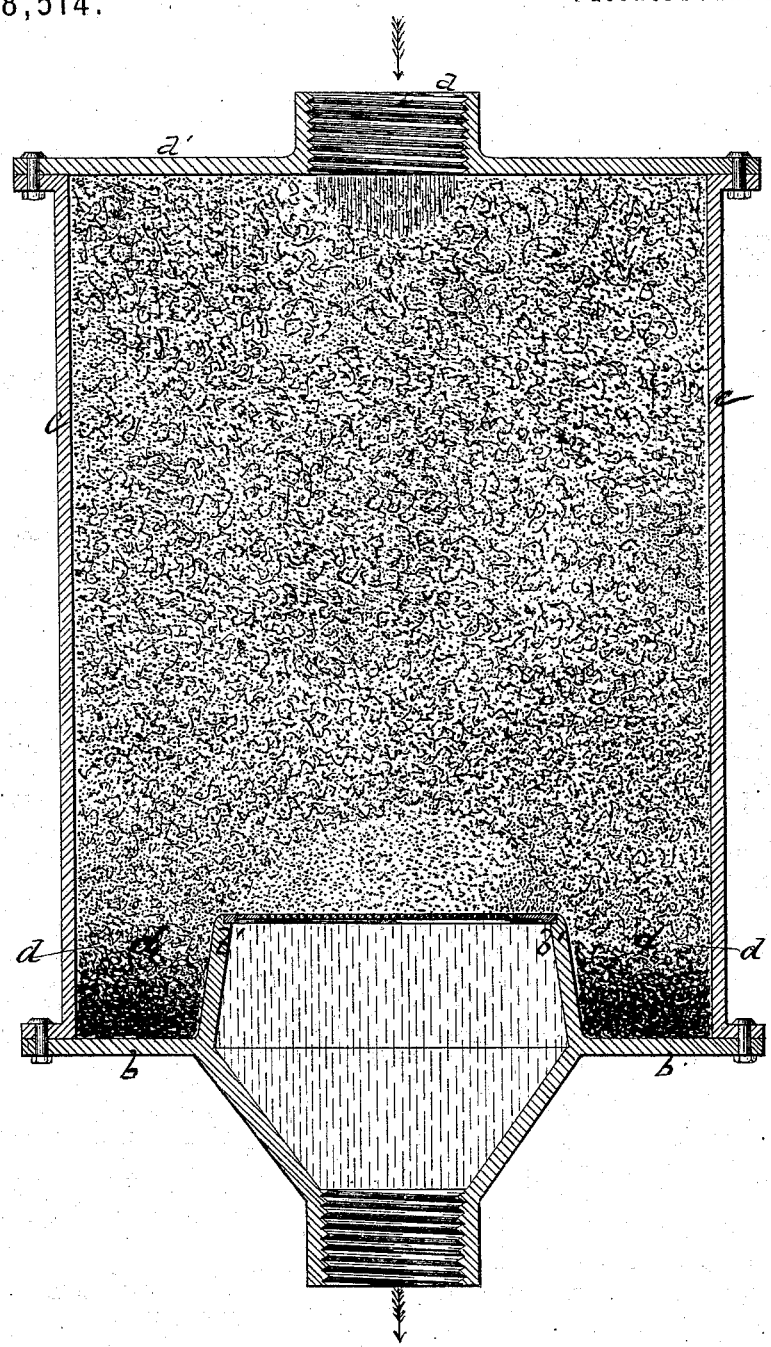

JOHN OUTERSON AND ANDREW OUTERSON, OF WINDSOR LOCKS, CONN.

IMPROVEMENT IN FILTERS.

Specification forming part of Letters Patent No. 158,514, dated January 5, 1875; application filed September 19, 1874.

*To all whom it may concern:*

Be it known that we, JOHN OUTERSON and ANDREW OUTERSON, of Windsor Locks, in the county of Hartford and State of Connecticut, have invented certain new and useful Improvements Pertaining to Filters, of which the following is a specification:

The accompanying drawing is a view of a can for containing and making use of our new filtering material, the view representing the can as cut in central longitudinal section.

Our invention is a new filtering material for water and for other liquids that will not act destructively on the substance of the material.

The material is made by taking rags or other paper-making material, cutting it up as for making paper, boiling it as for making paper, washing as for making paper, and bleaching it as for making paper, giving a result that is known among paper-makers as "half-stuff." The bleaching and the boiling processes are not essential for all purposes, but are preferable. This half-stuff acts as an admirable filter, and when filled with sediment can be restored to its original purity by simply washing it.

We prefer to make use of this material in a vessel like that shown in the drawings. Suppose the water to be filtered to enter through the pipe $a$ in the end-plate $a'$. The body $c$ is filled with the half-stuff. The bottom plate $b$ is raised centrally and a strainer put in arm $b'$ to $b'$. The recesses $d$ prevent any sediment which may have worked down on the sides from passing out through the strainer. It is evident that the half-stuff must be contained in some kind of a vessel in order to make use of it for filtering purposes; and in the following claim we, therefore, specify the combination of the two, not, however, meaning to confine or limit ourselves to any particular kind, size, or shape of containing-vessel.

We claim as our invention—

A filter composed of paper-makers' half-stuff, contained in a suitable vessel.

JOHN OUTERSON.
ANDREW OUTERSON.

Witnesses:
ALFRD W. CONVERSE,
WILLIAM KELLY.